United States Patent Office 3,391,268
Patented July 2, 1968

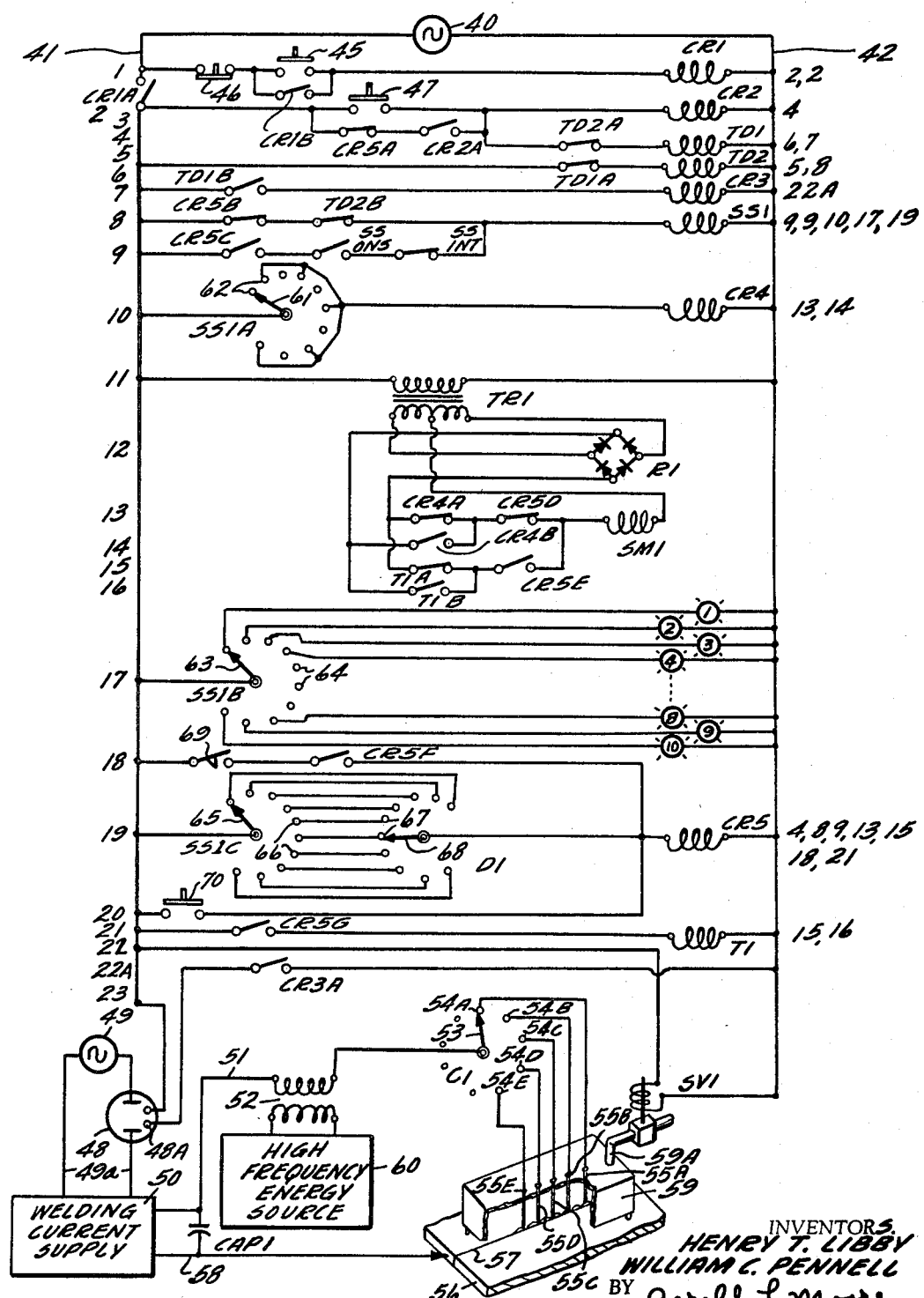

3,391,268
WELDING APPARATUS CONTROL
Henry Thomas Libby, Reading, and William Carney
Pennell, Saugus, Mass., assignors to General Electric
Company, a corporation of New York
Filed May 25, 1964, Ser. No. 369,813
8 Claims. (Cl. 219—124)

ABSTRACT OF THE DISCLOSURE

A control circuit for a welding apparatus utilizing a plurality of nonconsumable spaced electrodes which are selectively energized in a predetermined pattern for a predetermined time interval. The control circuit includes a source of welding current for energizing the spaced electrodes to effect a welded joint. A timer means is connected to the source of welding current for interrupting the flow of welding current for predetermined periods of time. Switching means responsive to the timer means are provided for sequentially connecting the source of welding current to selected spaced electrodes only when said timer means has interrupted the welding current. A source of inert atmospheric is responsive to the timer means for supplying an inert atmosphere to the weld junction when the electrodes are energized.

---

This invention relates to a welding apparatus control and more specifically to a control for a welding apparatus utilizing multiple energizing means such as electrodes of the nonconsumable type which are spaced along a welding juncture and selectively energized to effect the welding of the joint.

As disclosed in U.S. Patent 3,114,829, Libby, entitled, "Arc Welding Method and Apparatus," and assigned to the same assignee, it has been found that a very effective welding method involves the positioning of a plurality of nonconsumable electrodes in spaced relationship and electrically insulated one from the other along a juncture and by proper programming the sequence of the arcs emitted from each of the electrodes by control of the supply of welding current to the electrodes a very effective fusion weld can be effected along the juncture. However, to accomplish such a weld in this manner sequential programming of all the necessary welding steps must be carried out to provide repeated welds of good quality. For instance the controlling of both the quantity and timing of electrical energy to each electrode must be precise; furthermore, the programming of the supply of an inert atmosphere to the juncture during welding, if an inert atmosphere is necessary, must be coordinated with the scheduling of electrical energy to each electrode, and it may be desirable to transmit a high frequency signal to the electrode prior to conducting welding current through the electrode for establishing the arc between the workpiece and electrode for effective welding. Since it is well known that greater arcing exists in switching direct current such as may be used as the welding current, a means must be provided to reduce such arcing, for instance by interrupting the welding current prior to switching to other electrodes. The present invention is directed to the solution of these problems by providing a welding apparatus control suitable for use with a multiple electrode welding apparatus to control the energization of said electrodes in a programmed sequence. While the embodiment described utilizes an arc welding system with multiple nonconsumable electrodes spaced along the weld juncture, it should be understood that this control is applicable to other types of welding processes such as plasma arc, electron beam, etc. Therefore where the term electrode is used this is meant to include welding tips, beam emitters and the like since some of the same control problems exist in controlling these types of welding processes utilizing multiple electrodes as exist in the arc welding process described.

It is therefore one object of this invention to provide a welding apparatus control for use with a multiple electrode welding apparatus.

It is a further object of this invention to provide a control for a welding apparatus where the welding apparatus utilizes multiple electrodes spaced along the weld juncture with the control programming the energization of the electrodes and the other functions necessary for an effective welding process.

Other objects and many of the attendant advantages of this invention will be readily appreciated as the same becomes better understood by reference to the following detailed description when considered in connection with the accompanying drawing wherein:

The figure illustrates in schematic form the electrical control for carrying out the multiple electrode welding process.

Referring now to the drawing, power is supplied by a power source such as source 40 to energize conductors 41 and 42 with the individual control circuits connected for energization between these lines. The individual control circuits are numbered consecutively to the left of conductor 41 with the operating coil, etc., of the various components of the control included in these circuits and labeled by the proper descriptive terms. To the right of line 42 are listed the numbers of the circuits which include contacts operated by the active component of that circuit beside which they are listed. Therefore, by referring to a circuit and noting the numbers to the right of the circuit, the other circuits affected by the operation of that circuit may be located. The contacts are illustrated in their normal position, that is normally closed or normally open if the operating coil in not energized.

Referring to circuit 1 a Power On push button switch 45 is provided for energizing the control such that when the push button is closed control relay coil CR1 is energized causing contact CR1B in circuit 2 to be closed which acts as a holding circuit around the push button 45 to maintain the coil CR1 energized after the push button is released. Contact CR1A is also closed in conductor 41 energizing the circuit of the control. Additionally an Emergency Stop switch 46 is provided to de-energize the circuit if needed.

After relay CR1 is energized and its contacts closed, the Starter switch 47 may be operated to initiate the control cycle by energizing control relay coil CR2 and circuit 3. This switch is by-passed by the closing of contact CR2A of circuit 4 since contact CR5A is normally closed. One of the primary functions of this control is to supply motive fluid or welding current to the individual welding electrodes in a manner such that the duration of the current is timed and a cooling or shut off period is allowed between the energization of one electrode or electrodes and the next electrodes. To accomplish this, circuit 5 contains a time delay relay coil TD1 and circuit 6 includes a time delay relay coil TD2 with the circuit 5 including a normally closed contact TD2A and circuit 6 including normally closed contact TD1A. These relays TD1 and TD2 operate such that upon energization they will actuate the related contacts for predetermined time intervals and then allow the contacts to return to their normal position. Upon de-energization of the operating coil the relays will reset to again complete this cycle. By functioning in this manner these time delay relays are connected in a "flip flop" manner such that upon closing of starter switch 47 the time delay relay TD1 is energized for a given time interval to open contact TD1A to reset time relay TD2 while relay TD1 is in operation. After TD1 is energized for the preselected time interval, it again closes contact TD1A to energize TD2 of circuit 6 which opens contact TD2A to de-energize and reset relay TD1. Time delay relay TD1 is referred to as the "weld" timer and time delay relay TD2 is referred to as the "cool" timer since during operation of TD1, as will be seen later, welding current is permitted to flow to a preselected welding electrode or electrodes and during operation of timer TD2 no weld current is passed to any electrode. This period is referred to as the cool period during which the workpiece is allowed to cool. The timing of the cool period is determined by the necessity of preventing the workpiece from heating to the point of causing internal stressing of the material as well as allowing time for switching the current to other electrodes to continue the welding process.

To control the welding current, when timer TD1 is energized contacts TD1B of circuit 7 are closed to energize the control relay CR3. Upon energization of control relay CR3 contact CR3A of circuit 22A is closed to energize the control circuit 48a of an ignitron 48 which is in series electrical connection with a power supply 49 energizing the welding current or motive fluid supply 50 through conductors 49a. The welding current supply 50 may be regulated to supply the desired welding current through conductor 51 and transformer 52 to a commutator switch C1 having a commutator brush or arm 53 which may contact individually one of the contacts 54a, 54b, 54c, 54d and 54e which are connected by conductors to a series of non-consumable electrodes 55a, 55b, 55c, 55d and 55e. While the number of electrodes in the illustration is limited it should be understood that any number of electrodes may be provided depending upon the requirements of the welding application. The electrodes 55 are spaced along a workpiece 56 and aligned with a weld juncture 57 in the normal manner with a ground conductor 58 returning current to the welding current supply 50. As described in the beforementioned Patent 3,114,829, the welding operation is effected by a successive programmed energization of the electrodes 55 to form a continuous weld along the weld juncture 57. This weld juncture is enclosed by enclosure 59 which may be supplied with an inert atmosphere through tube 59a, the supply of which is controlled by the solenoid valve SV1 which is energized to an open position when contact CR1A is closed upon actuation of the Power On button 45 of circuit 1. Additionally cooling water to the ignitron or other functions can be controlled in like manner. To assist in establishing the arc between the electrode 55 and the weld juncture a high frequency signal is interposed on the welding current signal, this is supplied by the high frequency signal source 60 which is transformer coupled through transformer 52 to the welding current circuit. Capacitor CAP1 bypasses the welding current supply in the return circuit of the high frequency signal circuit. An example of such a high energy high frequency signal is a signal of 2,000 to 4,000 volts and a frequency of 1.5 megacycles, this signal serves to ionize the gas between the electrode tip and the workpiece for proper conduction of the welding current for establishing the arc essential for the fusion welding process.

As heretofore described when the weld timer TD1 is energized the contact TD1B is closed to energize the control relay CR3 and close contact CR3A of circuit 22A to cause the ignitron 48 to conduct. Power therefore is supplied from power source 49 to the welding current supply 50 which is subsequently conducted through the commutator switch C1 to the selected electrode 55 for energization of one or more electrodes of the welder. This energization continues until weld timer TD1 cycles to open contact TD1B and de-energize control relay CR3.

After timer TD1 cycles to permit closing of contact TD1A, timer TD2 is energized to effect the cool cycle. In circuit 8 contact TD2B is thereby opened which allows de-energization of the stepping switch coil SS1. With de-energization of stepping switch SS1 the armature SS1A is moved one contact, therefore on every other de-energization of SS1, the switch SS1A completes the circuit through the control relay coil CR4 connected in series with every other contact of the switch SS1A.

Switch SS1A controls indirectly the energization of the stepping motor SM1 by controlling the energization of control relay CR4 of circuit 10 having contact CR4A and CR4B of circuits 13 and 14 respectively. Circuit 11 includes the primary winding of transformer TR1 with the secondary winding of this transformer connected through a full wave rectifier R1 of circuit 12 connected with the positive side passing through the normally open contact CR4B and the normally closed contact CR5D through the stepping motor winding SM1 back to a center tap of the secondary winding of TR1. The negative side of the rectifier R1 is connected to the stepping motor winding SM1 through the normally closed contact CR4A and CR5D of circuit 13. Since the energization of control relay CR4 causes its contacts in circuits 13 and 14 to alternate in opening and closing, the contacts therefore alternate in connecting the stepping motor SM1 to opposite polarity poles of the full wave rectifier R1. The current through SM1 is reversed each time the control relay CR4 of circuit 10 is either energized or de-energized causing the motor SM1 to advance one step.

Referring now to the cool timer TD2 which controls the energization of stepping switch SS1 through contact TD2B, when the cool timer TD2 is energized the action of the stepping switch SS1 causes the stepping motor SM1 to move one position. The stepping motor SM1 actuates commutator C1 to switch the commutator arm 53 to the next electrode contact 54 during the cool cycle of timer TD2. In this manner the commutator C1 is only switched during the cool cycle since at this time the timer TD1 is de-energized to open contact TD1B to de-energize control relay CR3. Control relay CR3 controls the energization of the welding current supply 50 by controlling the conduction of ignitron 48 thereby allowing commutator C1 to switch only during the time there is no welding current flow to prolong the life of this commutator by limiting arcing of the contacts. The ignitron 48 or a similar switching device is utilized to limit and withstand any arcing caused by the interruption of the current source to the welding current supply 50. Although in this embodiment the high frequency signal from the source 60 is conducted through the welding circuit during this switching, this is an alternating current of low current magnitude therefore switching presents no problems when compared to switching the high magnitude welding current, however this signal may also be interrupted in the same manner as the welding current if desired.

Circuit 17 includes a second pole of the stepping switch SS1 identified as switch SS1B having an commutator arm 63 contacting a series of contacts 64 with each contact connected in series with an indicator light. Each advance of the stepping switch SS1 illuminates one light and thus indicates at all times the position of the stepping switch thereby indicating the electrode which is connected in the circuit.

Circuit 19 includes a third pole of the stepping switch SS1 numbered SS1C comprising a commuatator arm 65 with a series of contacts 66 which are in turn connected by individual conductors to a like series of contacts 67 of a manually operated switch D1 having a commutator arm 68 in series connection with a control relay CR5. After a selected number of electrodes have been energized this switching circuit is designed to return the stepping switch and the commutator C1 to the initial starting position and de-energize the timer in preparation for the next cycling of the welding operation. Switch D1 is positioned on that contact following the contact of the last electrode to be energized and with each step of stepping switch SS1, the armature 65 moves one contact until such time as it reaches the contact 66 corresponding to that contact of the contact series 67 at which the commutator arm 68 is positioned. When the commutator arm 65 reaches this contact, control relay coil CR5 is energized since circuit 19 is closed, closing contact CR5F of circuit 18 to maintain relay CR5 energized through contacts 69 closed in all except the starting position. Additionally contact CR5A in circuit 4 opens the starting circuit to deenergize relay CR2 and stop timer TD1 closing contact TD1A of circuit 5. Timer TD2 will operate to the end of its cycle at which time it will also stop since by its normal operation it ceases operation at the end of the timing cycle. Further, contact CR5B in circuit 8 opens to remove the stepping switch SS1 from the control of time delay relay contact TD2B and allows it to be stepped rapidly by interrupter contact SS–INT since contact CR5C of circuit 9 closes, this contact SS–INT will repeatedly open and close until the switch SS1 reaches the starting position at which time contact SS–ONS which is mechanically coupled to the commutator arm of switch SS1 opens to de-energize circuit 9.

At the same time contact CR5D of circuit 13 opens to remove the coil of stepping motor SM1 from the control of relay contact CR4A while contact CR5E in circuit 15 closes to connect the stepping motor to the circuit motor contacts T1A an T1B. Circuit 21 contains contact CR5G which closes to energize the circuit motor T1 connected to drive the contacts T1A and T1B of circuits 15 and 16 rapidly open and closed to move the stepping motor SM1 to its starting position. When the commutator C1 driven by the motor SM1 reaches the starting position the normally closed switch 69 of circuit 18 opens and since the commutator SS1C is now also moved to the start position the energizing circuit to the coil CR5 of circuit 19 is opened and the complete circuit is de-energized back to the Power On button 45 of circuit 1. The control is now in position waiting the next operation which may be initiated by closing the Start button 47 of circuit 3. If for some reason, the Emergency Stop button of circuit 1 is actuated, for instance in an emergency, all operation of the control will stop at this point without any resetting action by the stepping switches since this de-energizes the complete circuit. When the Power On button 45 is again depressed to prepare the control for a welding cycle the control will be positioned at some point indicated by the pilot light of circuit 17. However, this position will not normally be at the proper starting position if an emergency stop is effected. Circuit 20 therefore includes a Reset button 70 which energizes the control relay CR5 of circuit 19 to initiate a reset operation at which time the before described resetting operation will cycle completely and the control will again be positioned in the starting position.

From the foregoing there has been described a complete control for a multiple electrode type of welding apparatus with the control described in one electrical embodiment. While only this particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A control for welding apparatus in which a plurality of spaced electrodes are positioned along the welding juncture and selectively energized to effect the welded joint, said control comprising:
   a source of welding current for energizing said spaced electrodes to effect a welded joint,
   timer means connected to the source of welding current for interrupting the flow of welding current for predetermined periods of time,
   switching means responsive to timer means for sequentially connecting said source of welding current to selected spaced electrodes,
   said switch means operable to switch the source to other electrodes only when said timer means has interrupted the welding current,
   a source of inert atmosphere, and
   means responsive to timer means to supply said inert atmosphere to said weld juncture when said electrodes are energized.

2. A control for welding apparatus in which a plurality of spaced electrodes are positioned along the welding juncture and selectively energized to effect the welded joint, said control comprising:
   a source of welding current for energizing said spaced electrodes to effect a welded joint,
   timer means connected to the source of welding current for interrupting the flow of welding current for predetermined periods of time,
   switching means responsive to timer means for sequentially connecting said source of welding current to spaced electrodes,
   said switch means operable to disconnect said source from one electrode and connect to source to other electrode means only when said timer means has interrupted the welding current.

3. A control for a welding apparatus in which a plurality of electrodes are positioned along a welding juncture and selectively energized to effect the welding process, said control comprising:
   a source of welding current,
   first means to sequentially connect said source of welding current to preselected electrodes in a predetermined sequence to allow energization of said electrodes by welding current flow,
   second means to schedule said welding current flow to allow current to flow for a predetermined time interval and cease flowing for a predetermined time interval for each sequential connection of said source of welding current to preselected electrodes,
   said first means responsive to second means and operable to disconnect and connect said electrodes to allow energization of said electrodes only when said second means has interrupted welding current flow.

4. A control for arc welding apparatus having a plurality of welding electrodes, said control comprising:
   a source of arc welding current,
   a switching means having conductive means connected to each electrode for conduction of current to selected electrodes,
   current conductive means connected between said switching means and said source of arc welding current,
   said current conductive means including interruption means to interrupt said current flow,
   and switching means responsive to interruption means, and operable to switch said current flow to different electrodes only when said current flow is interrupted by said interrupting means.

5. A control for welding apparatus comprising:
   a source of welding current,
   a plurality of electrodes positioned along a welding juncture,
   switch means for connecting welding current source to said electrodes in a predetermined sequence of operation,
   timer means for interrupting the flow of welding current from welding current source,
   means responsive to timing means for actuating switch means upon interruption of flow of welding current,
   means responsive to timing means for identifying electrodes being energized.

6. A control for a welding apparatus as defined by claim 5 wherein means responsive to timing means for actuating switch means include motor means connected to and directly responsive to rectifier means.

7. A control for a welding apparatus comprising:
a source of welding current,
a source of high frequency energy coupled to welding current source,
a plurality of electrodes positioned along the welding juncture,
a controlled supply of inert atmosphere supplied to said electrodes,
switch means for connecting welding current source to electrodes in a predetermined sequence of operation,
timer means for interrupting the flow of welding current from welding current source,
means responsive to timing means for actuating switch means upon interruption of the flow of welding current,
means responsive to timing means for identifying the electrodes being energized,
means responsive to timing means for stopping the weld cycle and recycling the sequence of operation.

8. A control for a welding apparatus as defined by claim 7 wherein the means responsive to timing means for stopping the weld cycle and recycling the sequence of operation includes a manually operable commutator switch mechanism.

References Cited

UNITED STATES PATENTS

| | | | |
|---|---|---|---|
| 1,269,617 | 6/1918 | Ledwinka | 219—87 |
| 2,354,313 | 7/1944 | Harris | 219—87 |
| 2,372,117 | 3/1945 | Purat | 219—87 |
| 2,784,349 | 3/1957 | Anderson | 219—135 |
| 2,798,937 | 7/1957 | Miller. | |
| 3,114,829 | 12/1963 | Libby. | |
| 3,299,249 | 1/1967 | Sciaky | 219—131 |

RICHARD M. WOOD, *Primary Examiner.*

W. D. BROOKS, *Assistant Examiner.*